US005472548A

United States Patent [19]

Lindsay et al.

[11] Patent Number: 5,472,548

[45] Date of Patent: Dec. 5, 1995

[54] DECORATIVE ARTICLE EMULATING AN ACTUAL BASKETBALL COURT

[75] Inventors: Donald E. Lindsay, Mableton; David E. Lucey, Marietta, both of Ga.

[73] Assignee: Courts & Cards, Inc., Marietta, Ga.

[21] Appl. No.: 263,552

[22] Filed: Jun. 22, 1994

Related U.S. Application Data

[63] Continuation of Ser. No. 968,825, Oct. 30, 1992, abandoned.

[51] Int. Cl.$^6$ .......... B23B 31/00

[52] U.S. Cl. .......... 156/277; 273/1.5 R; 273/287; 434/79

[58] Field of Search .......... 156/277; 273/1.5 R, 273/287; 434/72, 79

[56] References Cited

U.S. PATENT DOCUMENTS

| | | | |
|---|---|---|---|
| D. 325,306 | 4/1992 | Barfield | D6/451 |
| 3,959,050 | 5/1975 | Hooper, Jr. | 428/913.3 |
| 4,125,655 | 11/1978 | Kanzelberger | 428/913.3 |
| 4,216,993 | 8/1980 | Shumaker | 297/157 |
| 4,293,362 | 10/1981 | Drobina | 156/264 |
| 4,674,745 | 6/1987 | Speranza | 428/251 |
| 4,900,378 | 2/1990 | Wislehutt | 428/542.6 |
| 5,240,259 | 8/1993 | O'Grady | 273/402 |

*Primary Examiner*—Chester T. Barry
*Attorney, Agent, or Firm*—Bell, Seltzer, Park & Gibson

[57] ABSTRACT

A decorative article having the appearance of an athletic court or other sports surface is provided. The decorative article comprises a plurality of strips of substantially equal dimension in adjacently contacting relation with each other. Each of the strips has a unite appearance characteristic, namely the strips have the grain appearance of actual planks of wood such as the multitude of planks of wood making up an actual basketball court. On the plurality of strips is a printed design wherein the overall characteristic of the plurality of strips and printed design is the scale emulation of the appearance of an athletic court or other sports surface, namely emulating both the grain appearance of actual wood planks, and the game lines and team logos of an actual court.

1 Claim, 2 Drawing Sheets

DECORATIVE ARTICLE EMULATING AN ACTUAL BASKETBALL COURT

This application is a continuation of prior application Ser. No. 07/968,825, filed on Oct. 30, 1992, now abandoned, the disclosure of which is incorporated by reference herein in its entirety.

FIELD OF THE INVENTION

This invention relates to a decorative article, and more particularly to a decorative article with a surface that emulates the appearance of an actual athletic court or other sports surface and a method of making the same.

BACKGROUND OF THE INVENTION

With the great enthusiasm for sports in the United States and in other countries, there is a demand for novelty items that commemorate individual athletes, teams, and the places where they play. There are many different kinds of sports memorabilia available, but there are few, if any, sports novelties available that realistically emulate the appearance of athletic courts or surfaces, particularly surfaces constructed from wooden planks (i.e., basketball courts). First, it is difficult to achieve the unique grained appearance of a planked wooden surface without actually using strips of wood since each piece of wood in an actual court has its own individual grain. On a small scale, achieving the grained look is difficult because of the problems of cutting harder woods into smaller rectangular strips. Second, although it is possible to hand paint game lines and team logos onto novelty items, such practice is time consuming and expensive.

SUMMARY OF THE INVENTION

It is therefore an object of the present invention to provide a process for mass producing decorative articles that emulate to scale the appearance of an athletic court or other sports surface that looks realistic.

It is another object of the present invention to provide a decorative article that has a grain appearance of a planked court.

These and other objects according to the present invention are provided by a decorative article having the appearance of an athletic court or other sports surface comprising a plurality of strips of substantially equal dimension in adjacently contacting relation with each other. Each of the strips has a unique appearance characteristic, namely the strips have the grain appearance of actual planks of wood such as the multitude of planks of wood making up an actual basketball court. On the plurality of strips is a printed design wherein the overall characteristic of the plurality of strips and printed design is the scale emulation of the appearance of an athletic court or other sports surface, namely emulating both the grain appearance of actual wood planks, and the game lines and team logos of an actual court.

The present invention also provides a method of making a decorative article having the appearance of an athletic court or other sports surface. The method comprises placing a plurality of strips of substantially equal dimensions in adjacently contacting relation with each other, and printing a design on the plurality of strips to provide a decorative article with the overall characteristic emulating the appearance of an athletic court or other sports surface. Preferably, the strips of substantially equal dimension are bonded together (e.g., using glue) and are bonded to an underlying support means. The design is preferably scaled from an actual athletic court or surface.

DETAILED DESCRIPTION OF THE PREFERRED EMBODIMENTS

Figure 1:
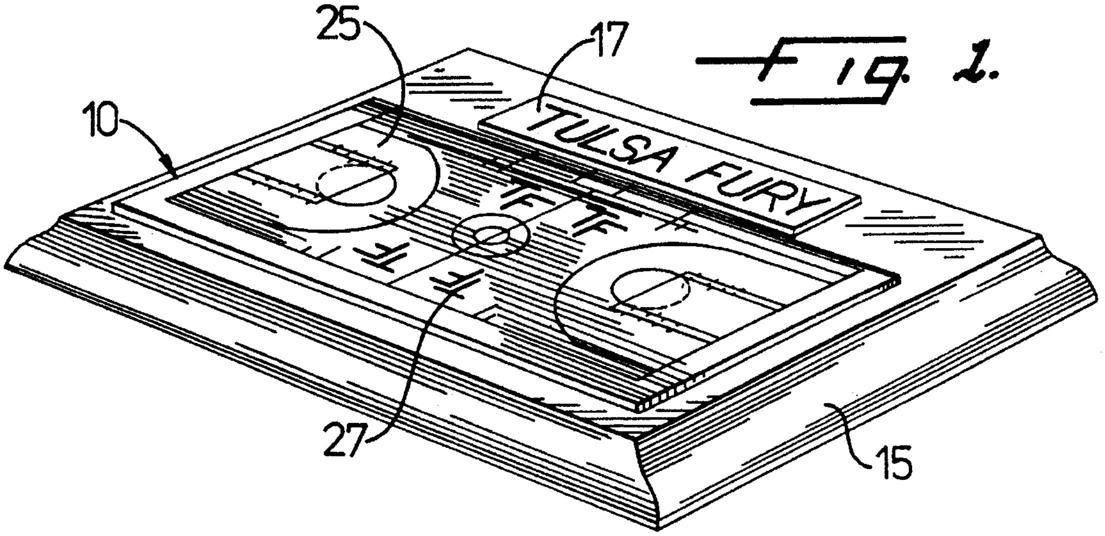
FIG. 1 is a perspective view of the completed decorative article depicting the home basketball court of a fictitious basketball team, the Tulsa Fury.

The present invention will now be described more fully hereinafter with reference to the accompanying drawings, in which preferred embodiments of the invention are shown. This invention may, however, be embodied in many different forms and should not be construed as limited to the embodiments set forth herein. Rather, Applicants provide these embodiments so that this disclosure will be thorough and complete, and will fully convey the scope of the invention to those skilled in the art. In the drawings, the thickness of layers and regions are exaggerated for clarity. Like characters refer to like elements throughout.

Referring to FIG. 1, a decorative article having the appearance of a sports surface (e.g., a basketball court) is illustrated and is broadly designated by the reference numeral 10. The decorative article can be mounted or bonded on a plaque 15 or other underlying support means, and can include a name plate 17 such as "Tulsa Fury" which is a fictitious name of a basketball team.

Figure 2:
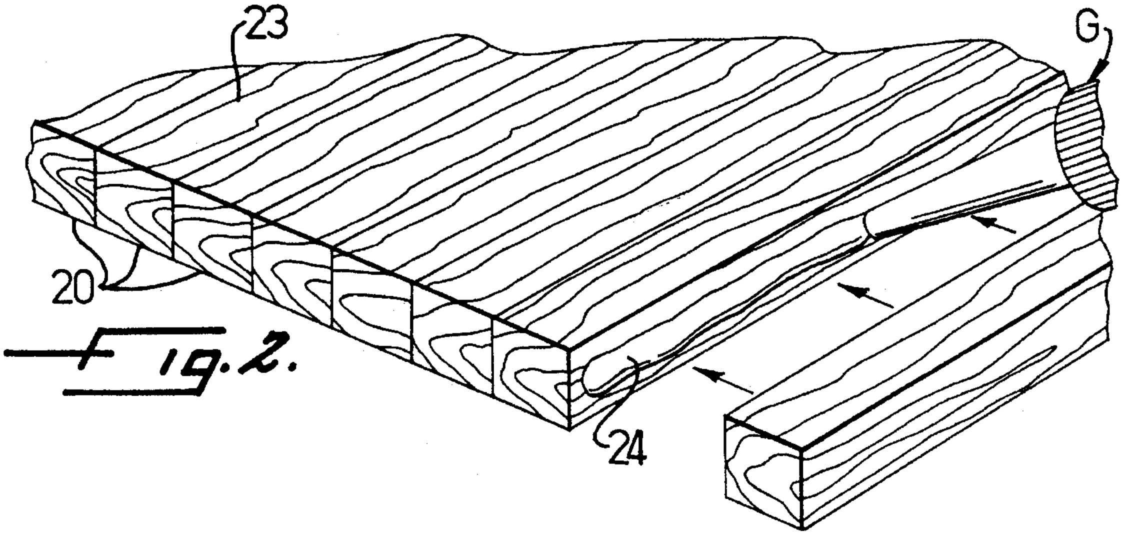
FIG. 2 is an enlarged perspective illustration showing how a plurality of strips, each with their unique grain characteristics, are placed in an adjacent relation and bonded together.

As shown in FIG. 2, the decorative article 10 includes a plurality of strips 20 of substantially equal dimension in adjacently contacting relationship with each other. Each of the strips has a grain appearance 23. Preferred strips 20 are strips of balsa wood which will have a natural grain although it is recognized that other woods such as maple, yellow pine, ash and the like could be used. Typically, the strips have an equal dimension of about 1/32 to 1/16 inch square and about 30 to 40 inches long with a 3/32 inch square strip having a length of 36 inches being preferred. The strips 20 are preferably bonded together with a layer 24 of glue applying using a glue supply G or other means for applying glue. It is recognized that other methods of bonding the strips together such as nails, brackets, etc. will be within the skill of one in the art.

Figure 3:
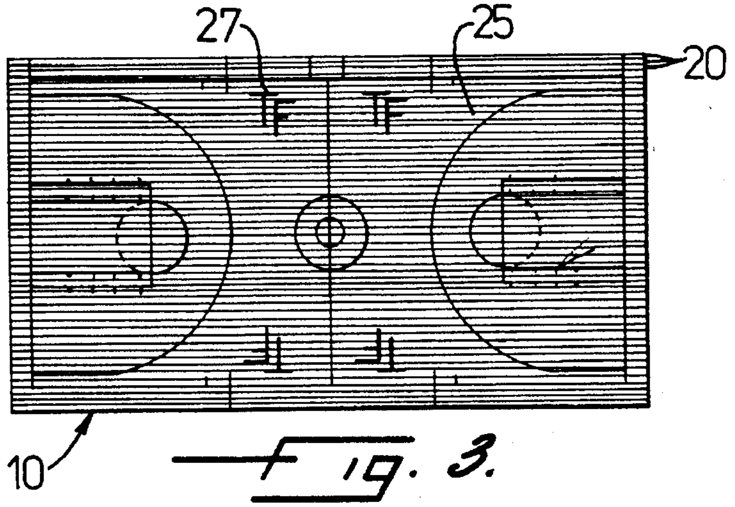
FIG. 3 is a top view showing a decorative article emulating a fictitious team's court.

Referring to FIG. 3, a decorative article 10 having a printed design 25 is shown. The printed design 25 is preferably applied using a silk screening technique. The printed design includes the markings of a basketball court or other sports surface (e.g., a football field) and indicia 27 of the home team such as the "TF" logo shown in the Figures. The decorative article and its plurality of strips and printed design 25 has a to scale emulation of the appearance of a basketball court or the like.

Figure 4:
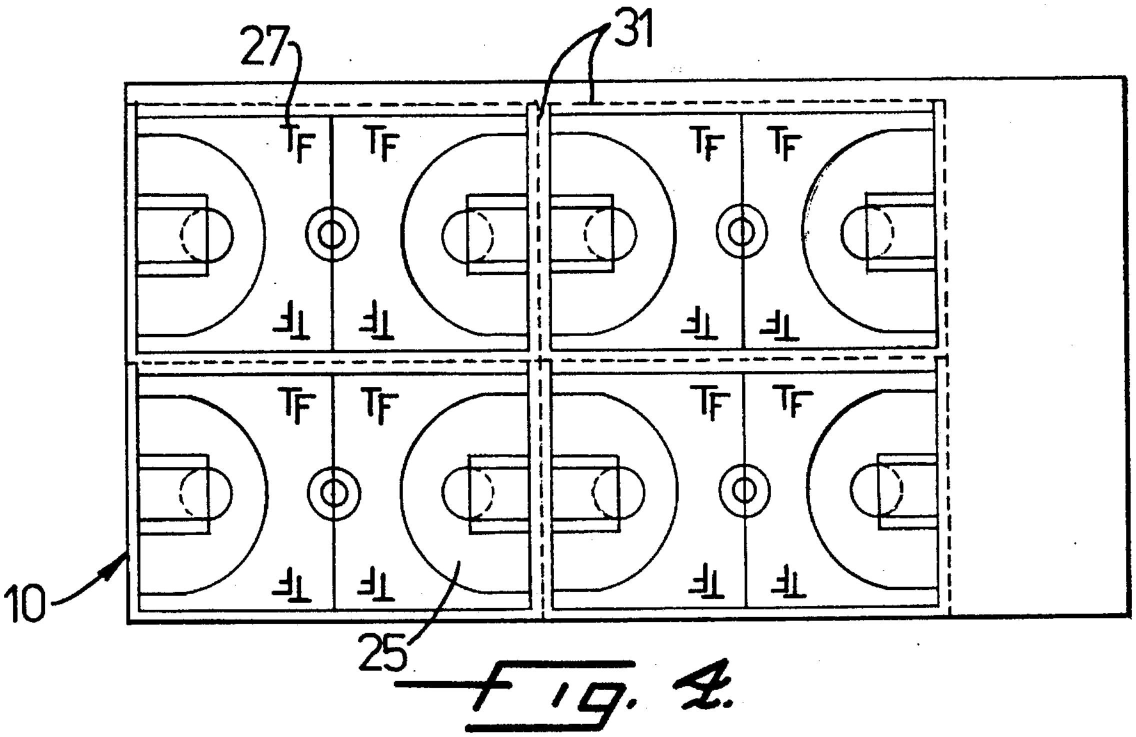
FIG. 4 is a top view of an embodiment showing a sheet, before cutting, consisting of a plurality of strips with four scaled basketball courts printed on its surface.
Figure 5:
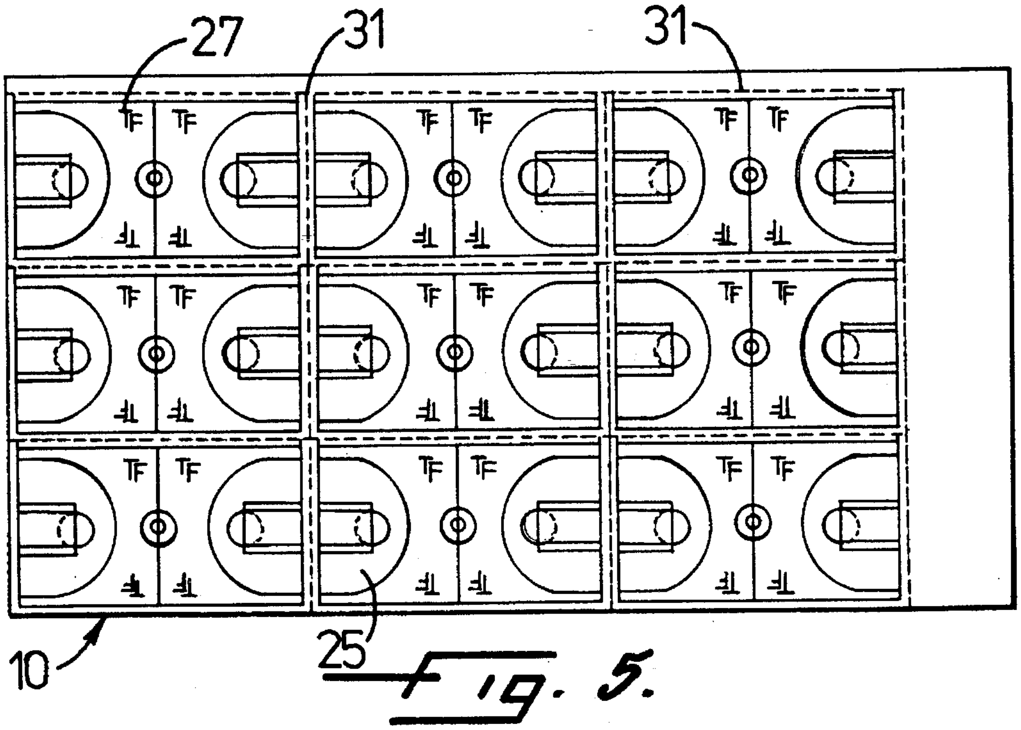
FIG. 5 is a top view of another embodiment showing a sheet, before cutting, consisting of a plurality of strips with nine scaled basketball courts printed on its surface.

Referring to FIGS. 4 and 5, configurations for mass producing the decorative articles 10 are illustrated. For example, FIG. 4 shows that if strips of 3/32 inch square strips of balsa wood are used to form a sheet that is about 19 inches wide and about 36 inches long the design of four scaled basketball courts with the dimensions of about 9 inches by about 15 inches will fit on one sheet. FIG. 5 shows that if strips of 3/32 inch square strips of balsa wood are used to form a sheet that is about 19 inches wide and about 36 inches long the design of nine scaled basketball courts with the dimensions of about 6 inches by about 10.5 inches will fit on one sheet. These dimensions and the printing of numerous designs on each sheet of a plurality of strips allows the novelty items to be mass produced more efficiently and less expensively.

In operation, the decorative article 10 is typically made by placing a plurality of strips 20 of substantially equal dimensions in adjacently contacting relationship with each other and printing a design 25 thereon. The plurality of strips 20 are typically glued together. After gluing, the strips 20 are sanded to smooth the surface and eliminate any excess glue. Then the pores of the strips 20 can optionally be filled with a pore filler such as Mohawk Paste Wood Filler Natural #606-2507. The strips can then be coated with a protective layer such as a polyurethane layer (not shown). An exemplary polyurethane is Carver Tripp Super Poly Polyurethane having Gloss Number 7133. The strips 20 are lightly sanded to rough up the surface for printing. The design 25 is then printed on the strips preferably using a silk screening technique. The silk screen is formed by scaling down an actual court down to the dimensions of the decorative article, and as shown in FIGS. 4 and 5, the silk screen design can be multiple courts. The scaling down and making the silk screen can be computerized although other techniques therefor will be readily with the skill of one in the art. A second protective polyurethane layer is then applied to cover the printed design. If the design is multiple courts, the individual courts are then cut from the multiple courts e.g. along horizontal and vertical score lines 31 shown in FIGS. 4 and 5. The individual courts can then be applied to an individualized plaque 15, having an individualized name plate 17.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A method for forming a decorative article having the appearance of an actual basketball court comprising the steps of:

(a) placing a plurality of substantially straight strips of balsa wood of substantially equal dimensions in adjacently contacting relationship with each other;

(b) bonding the plurality of strips together;

(c) silk screen printing basketball team logo and court markings on the plurality of strips of substantially equal dimensions in adjacently contacting relationship with each other to provide the plurality of strips with the substantially exact and scaled-down emulation of the size and appearance of the actual basketball court; and (d) applying a protective layer on the plurality of strips.

* * * * *